(12) United States Patent
Juan

(10) Patent No.: US 7,280,454 B2
(45) Date of Patent: Oct. 9, 2007

(54) METHOD AND SYSTEM FOR IDENTIFYING THE SIZE OF AN OPTICAL DISC

(75) Inventor: Kuan-Kai Juan, Taoyuan Hsien (TW)

(73) Assignee: Mediatek, Inc., Hsin-Chu (TW)

( * ) Notice: Subject to any disclaimer, the term of this patent is extended or adjusted under 35 U.S.C. 154(b) by 616 days.

(21) Appl. No.: 10/943,749

(22) Filed: Sep. 17, 2004

(65) Prior Publication Data

US 2005/0073925 A1   Apr. 7, 2005

(30) Foreign Application Priority Data

Oct. 1, 2003   (TW)  .............................. 92127181 A

(51) Int. Cl.
*G11B 5/09* (2006.01)
*G11B 7/00* (2006.01)

(52) U.S. Cl. .................... 369/53.2; 369/47.36

(58) Field of Classification Search ............. None
See application file for complete search history.

(56) References Cited

U.S. PATENT DOCUMENTS

| | | | |
|---|---|---|---|
| 4,653,040 A * | 3/1987 | Senso | 369/239 |
| 5,644,561 A | 7/1997 | Son et al. | |
| 6,414,924 B1 * | 7/2002 | Jin | 369/53.2 |
| 6,597,532 B1 * | 7/2003 | Usui et al. | 360/97.03 |
| 7,110,337 B2 * | 9/2006 | Kim et al. | 369/53.22 |
| 2007/0104061 A1 * | 5/2007 | Aufderheide et al. | 369/53.2 |

* cited by examiner

*Primary Examiner*—William R Korzuch
*Assistant Examiner*—Peter Vincent Agustin
(74) *Attorney, Agent, or Firm*—Thomas, Kayden, Horstemeyer & Risley

(57) ABSTRACT

A method for identifying the size of an optical disc includes the steps of driving a motor at a specified rotary torque for rotating the optical disc, measuring angular acceleration of the optical disc, and comparing the measured angular acceleration with a reference angular acceleration to identify the size of the optical disc. A system that performs the method is also disclosed.

3 Claims, 2 Drawing Sheets

METHOD AND SYSTEM FOR IDENTIFYING THE SIZE OF AN OPTICAL DISC

CROSS-REFERENCE TO RELATED APPLICATION

This application claims priority of Taiwanese application No. 092127181, filed on Oct. 1, 2003.

BACKGROUND OF THE INVENTION

1. Field of the Invention

The invention relates to a method and system for identifying the size of an optical disc, more particularly to a method and system for identifying the size of an optical disc within a relatively short period of time.

2. Description of the Related Art

Optical discs are currently available in standard sizes of eight-centimeter diameter and twelve-centimeter diameter. Motor control in a disc drive depends on the size of the optical disc. It is therefore necessary to identify the size of the optical disc prior to a read or write operation of the disc drive.

A conventional method for identifying the size of the optical disc includes moving an optical pickup head to a test position that is between eight and twelve centimeters from an initial position, and processing light detected by the optical pickup head. This method however requires a stepper motor for controlling the movement of the optical pickup head, and additional circuitries, thereby resulting in higher production costs.

In U.S. Pat. No. 5,644,561, there is disclosed another conventional method for identifying the size of the optical disc. The proposed method includes measuring the time necessary for the optical disc to reach a predetermined angular velocity or measuring the angular velocity of the optical disc after a predetermined time period. The measured time or angular velocity is then compared with a predetermined reference value to determine the size of the optical disc. Although the method proposed therein has its own merits, some waiting time is required for the optical disc to reach the predetermined angular velocity or before measuring of the angular velocity of the optical disc can be performed.

SUMMARY OF THE INVENTION

Therefore, the object of the present invention is to provide a method and system for identifying the size of an optical disc within a relatively short period of time and without increasing production costs so as to overcome the aforesaid drawbacks of the prior art.

According to one aspect of the present invention, a method for identifying the size of an optical disc comprises the steps of: driving a motor at a specified rotary torque for rotating the optical disc; measuring angular acceleration of the optical disc; and comparing the measured angular acceleration with a reference angular acceleration to identify the size of the optical disc.

According to another aspect of the present invention, a method for identifying the size of an optical disc comprises the steps of: driving a motor at a specified rotary torque for rotating the optical disc; measuring angular acceleration of the optical disc; and comparing the measured angular acceleration with a set of reference angular accelerations to identify the size of the optical disc.

According to yet another aspect of the present invention, a system for identifying the size of an optical disc comprises a motor, a control unit, a detector, a memory, and a processor. The motor is adapted for rotating the optical disc. The control unit is coupled to and controls the motor to operate at a specified rotary torque when rotating the optical disc. The detector measures angular acceleration of the optical disc when the optical disc is rotated by the motor while the motor operates at the specified rotary torque. The memory stores a reference angular acceleration. The processor is coupled to the detector and the memory, and compares the angular acceleration measured by the detector with the reference angular acceleration stored in the memory to identify the size of the optical disc.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
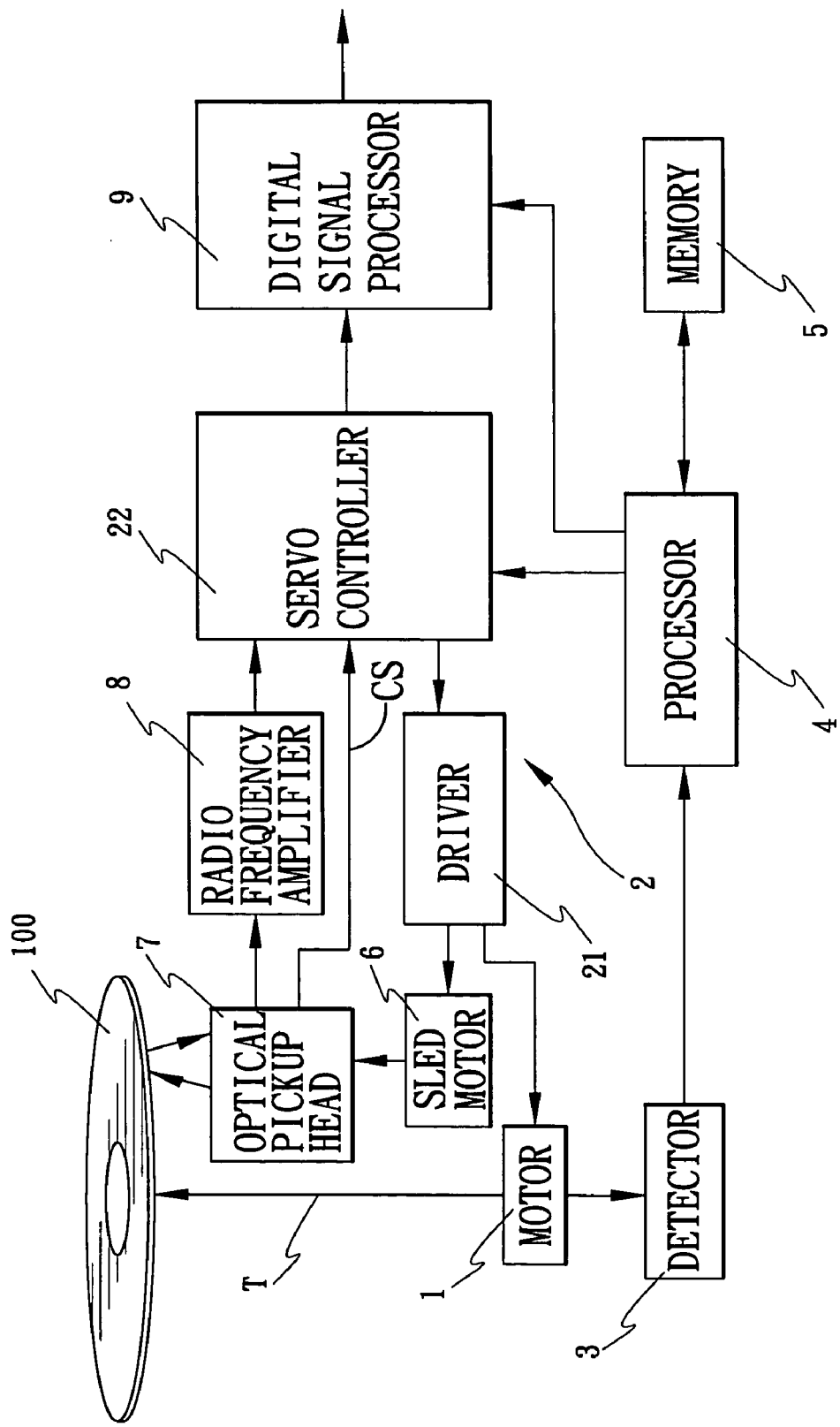
FIG. 1 is a schematic circuit block diagram of the preferred embodiment of a system capable of identifying the size of an optical disc according to the present invention.

Referring to FIG. 1, the preferred embodiment of a system for identifying the size of an optical disc 100 according to this invention is shown to include a motor 1, a control unit 2, a detector 3, a memory 5 and a processor 4.

The optical disc 100 may be a compact disc (CD) or digital versatile disc (DVD). The CD may be a CD Recordable (CD-R) and a CD Re-writable (CD-RW). The DVD may be a DVD Recordable (e.g. DVR–R and DVD+R) and a DVD Re-writable (e.g. DVD–RW and DVD+RW).

The system further includes a disc compartment (not shown) that is adapted to accommodate the optical disc 100.

The motor 1, such as a spindle motor, is adapted for rotating the optical disc 100 loaded in the disc compartment in a known manner.

The control unit 2 includes a driver 21 that is coupled electrically to and that controls the motor 1 to operate at a specified rotary torque (T), such as by controlling the voltage or current supplied to the motor 1, when rotating the optical disc 100. The driver 21 is further coupled electrically to and controls a sled motor 6 to move an optical pickup head 7 of the system. The control unit 2 further includes a servo controller 22 that is coupled electrically to and receives a control signal (CS) from the optical pickup head 7. The servo controller 22 is further coupled electrically to and controls the driver 21 to adjust angular velocity of the motor 1 in accordance with the control signal (CS).

The system further includes a radio frequency amplifier 8 coupled electrically to the optical pickup head 7, and a digital signal processor 9 coupled electrically to the servo controller 22. Data in the optical disc 100 is picked up by the optical pick-up head 7, is amplified by the radio frequency amplifier 8, and is provided to the digital signal processor 9 through the servo controller 22 for subsequent conversion and output to an external peripheral component (not shown). It is noted that the digital signal processor 9 is capable of decoding data in MPEG formats.

The detector 3 is coupled electrically to the motor 1, and measures angular acceleration of the optical disc 100 when the optical disc 100 is rotated by the motor 1 while the motor 1 operates at the specified rotary torque (T). Preferably, the detector 3 includes a Hall sensor (not shown).

In this embodiment, the memory 5 stores a set of reference angular accelerations that includes a first reference angular acceleration, a second reference angular acceleration larger than the first reference angular acceleration, a third reference angular acceleration larger than the second reference angular acceleration, and a fourth reference angular acceleration larger than the third reference angular acceleration.

The processor 4 is coupled electrically to the detector 3, the memory 5, the servo controller 22, and the digital signal processor 9. In this embodiment, the processor 4 is operable so as to compare the angular acceleration measured by the detector 3 with the set of reference angular accelerations stored in the memory 5 to identify the size of the optical disc 100, in a manner to be described hereinafter.

The rotary torque (T) of the motor 1 is expressed mathematically as:

$$T = I\alpha \quad [1]$$

in which:
I = the moment of inertia of the optical disc 100
α = the angular acceleration of the optical disc 100
The moment of inertia (I) can be calculated from the equation $$I = \tfrac{1}{2} M R^2 \quad [2]$$

where M is the mass of the optical disc 100, and R is the radius of the optical disc 100.

Accordingly, since a twelve-centimeter optical disc has a larger moment of inertia as compared to an eight-centimeter optical disc, the former has a smaller angular acceleration as compared to the latter under specified rotary torque conditions.

The first, second, third, and fourth reference angular accelerations are obtained by performing the following steps:

(a) measuring the angular acceleration of the motor 1 when the disc compartment is in an empty state;

(b) measuring the angular acceleration of the motor 1 when an eight-centimeter-diameter optical disc (not shown) is loaded in the disc compartment;

(c) measuring the angular acceleration of the motor 1 when two of the eight-centimeter-diameter optical discs are loaded in the disc compartment;

(d) measuring the angular acceleration of the motor 1 when a twelve-centimeter-diameter optical disc (not shown) is loaded in the disc compartment; and (e) measuring the angular acceleration of the motor 1 when two of the twelve-centimeter-diameter optical discs are loaded in the disc compartment.

Based on equations [1] and [2], and the measured angular accelerations, at a specified rotary torque (T), the first, second, third and fourth reference angular accelerations can be calculated using the following equations:

$$\alpha 1 = (X1 + X2)/2 \quad [3]$$

$$\alpha 2 = (X2 + X3)/2 \quad [4]$$

$$\alpha 3 = (X3 + X4)/2 \quad [5]$$

$$\alpha 4 = (X4 + X5)/2 \quad [6]$$

Where:
α1 = the first reference angular acceleration
α2 = the second reference angular acceleration
α3 = the third reference angular acceleration
α4 = the fourth reference angular acceleration
X1 = the angular acceleration measured in step (a)
X2 = the angular acceleration measured in step (b)
X3 = the angular acceleration measured in step (c)
X4 = the angular acceleration measured in step (d)
X5 = the angular acceleration measured in step (e)

Figure 2:
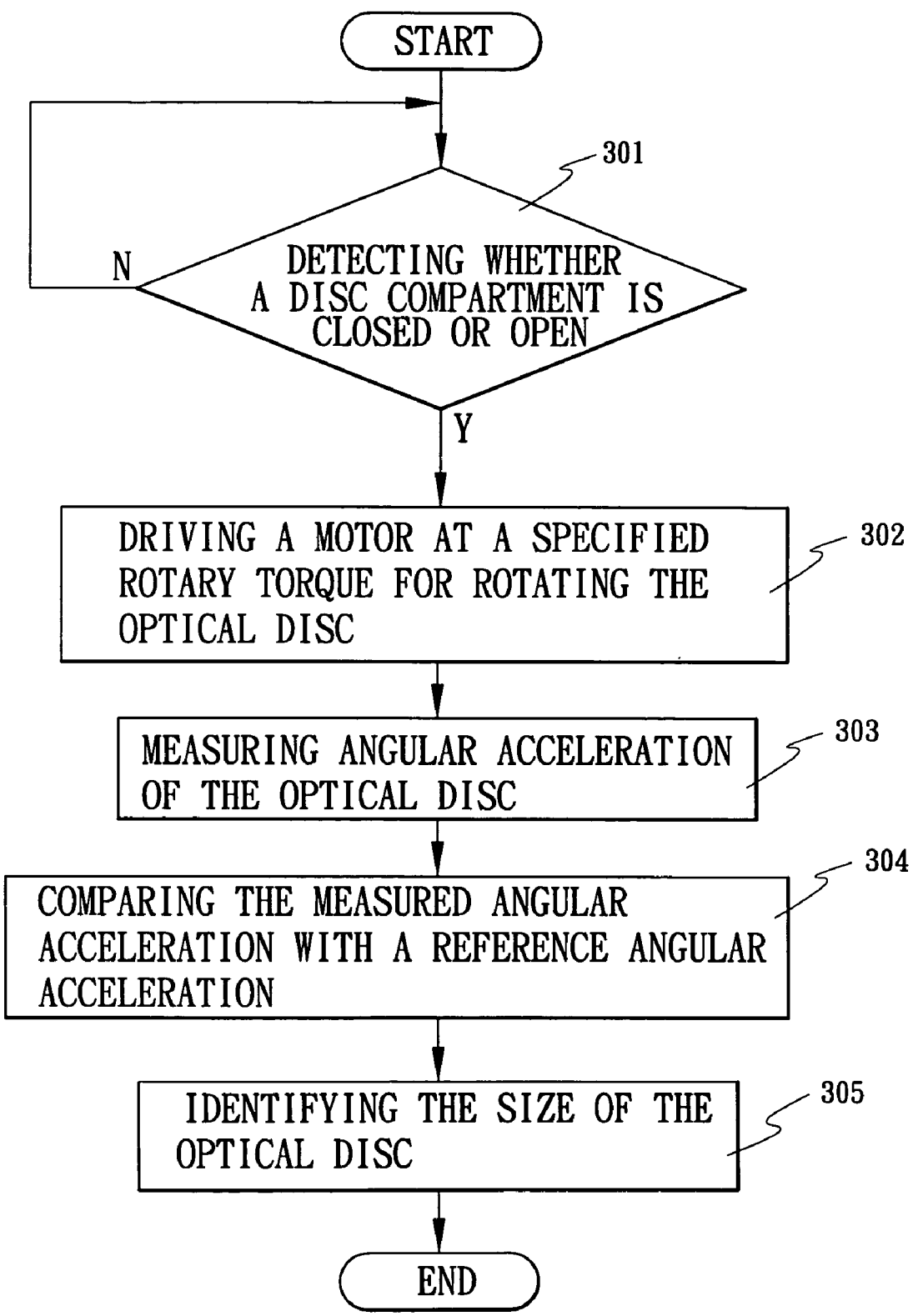
FIG. 2 is a flowchart of the preferred embodiment of a method for identifying the size of an optical disc according to the present invention.

The preferred embodiment of a method for identifying the size of an optical disc 100 according to this invention includes the steps shown in FIG. 2.

In step 301, the system is configured to detect whether the disc compartment is closed or open.

In step 302, when the disc compartment is closed, the servo controller 22 controls the driver 21 to drive the motor 1 at the specified rotary torque (T) for rotating the optical disc.

Thereafter, in step 303, the detector 3 measures first and second angular velocities of the optical disc 100 at first and second time instants, respectively. Based on the measured first and second angular velocities, and duration of a time period between the first and second time instants, the processor 4 calculates the measured angular acceleration of the optical disc 100 using the equation $$\alpha = d\omega/dt = \omega 2 - \omega 1 / t2 - t1 \quad [7]$$

where α is the measured angular acceleration of the optical disc 100, ω1 is the first angular velocity, w2 is the second angular velocity, t1 is the first time instant, and t2 is the second time instant.

In step 304, the processor 4 compares the measured angular acceleration with the set of reference angular accelerations.

Finally, in step 305, the processor 4 identifies the size of the optical disc 100 based on the result of the comparison. Particularly, when the measured angular acceleration is larger than the first reference angular acceleration and smaller than the second reference angular acceleration, the processor 4 identifies the optical disc 100 as having an eight-centimeter-diameter, and when the measured angular acceleration is larger than the third reference angular acceleration and smaller than the fourth reference angular acceleration, the processor 4 identifies the optical disc 100 as having a twelve-centimeter-diameter.

Once the size of the optical disc 100 is identified, the motor 1 can be subsequently controlled to drive rotation of the optical disc 100 at a proper angular velocity for read/write operations of the optical pickup head 7.

In this embodiment, the processor 4 can further identify an abnormal condition based on the result of the comparison. Particularly, when the measured angular acceleration is less than the first reference angular acceleration, the processor 4 identifies that the optical disc 100 is not loaded in the disc compartment and discontinues with the initialization procedure for the optical disc 100, and when the measured angular acceleration is between the second and third reference angular accelerations or is larger than the fourth reference angular acceleration, the processor 4 identifies that two optical discs 100 are loaded in the disc compartment and controls the servo controller 22 to stop the driver 21 from driving the motor 1, thereby protecting the system from possible damage.

It has thus been shown that the system of this invention includes a detector 3 that measures the angular acceleration of an optical disc 100, and a processor 4 that compares the measured angular acceleration with a reference angular acceleration to identify the size of the optical disc 100. The construction as such permits identification of the size of the optical disc 100 without the need for a relatively long waiting time.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for identifying the size of an optical disc, comprising the steps of:
   (A) driving a motor at a specified rotary torque for rotating the optical disc;
   (B) measuring angular acceleration of the optical disc; and
   (C) comparing the angular acceleration measured in step (B) with a set of reference angular accelerations to identify the size of the optical disc,
   wherein step (B) includes:
   (a) measuring a first angular velocity of the optical disc at a first time instant;
   (b) measuring a second angular velocity of the optical disc at a second time instant; and
   (c) calculating the angular acceleration of the optical disc based on the first and second angular velocities measured in sub-steps (a) and (b), and duration of a time period between the first and second time instants,
   wherein the set of reference angular accelerations includes a first reference angular acceleration, a second reference angular acceleration larger than the first reference angular acceleration, a third reference angular acceleration larger than the second reference angular acceleration, and a fourth reference angular acceleration larger than the third reference angular acceleration.

2. The method of claim 1, wherein, in step (C), the optical disc is identified as having an eight-centimeter-diameter when the measured angular acceleration is larger than the first reference angular acceleration and smaller than the second reference angular acceleration.

3. The method of claim 1, wherein, in step (C), the optical disc is identified as having a twelve-centimeter-diameter when the measured angular acceleration is larger than the third reference angular acceleration and smaller than the fourth reference angular acceleration.

* * * * *